Figures 1, 2:
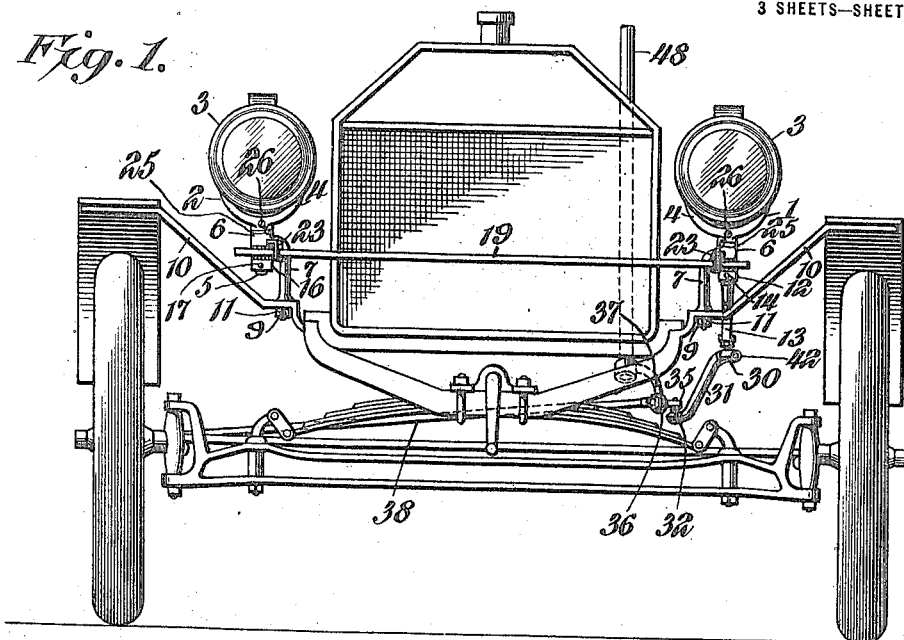

F. G. ANSPACH.
CONTROLLABLE HEADLIGHT FOR AUTOMOBILES.
APPLICATION FILED FEB. 9, 1914.

1,145,961.

Patented July 13, 1915.
3 SHEETS—SHEET 1.

WITNESSES
Howard D. Orr.

Francis G. Anspach, INVENTOR,
BY
ATTORNEY

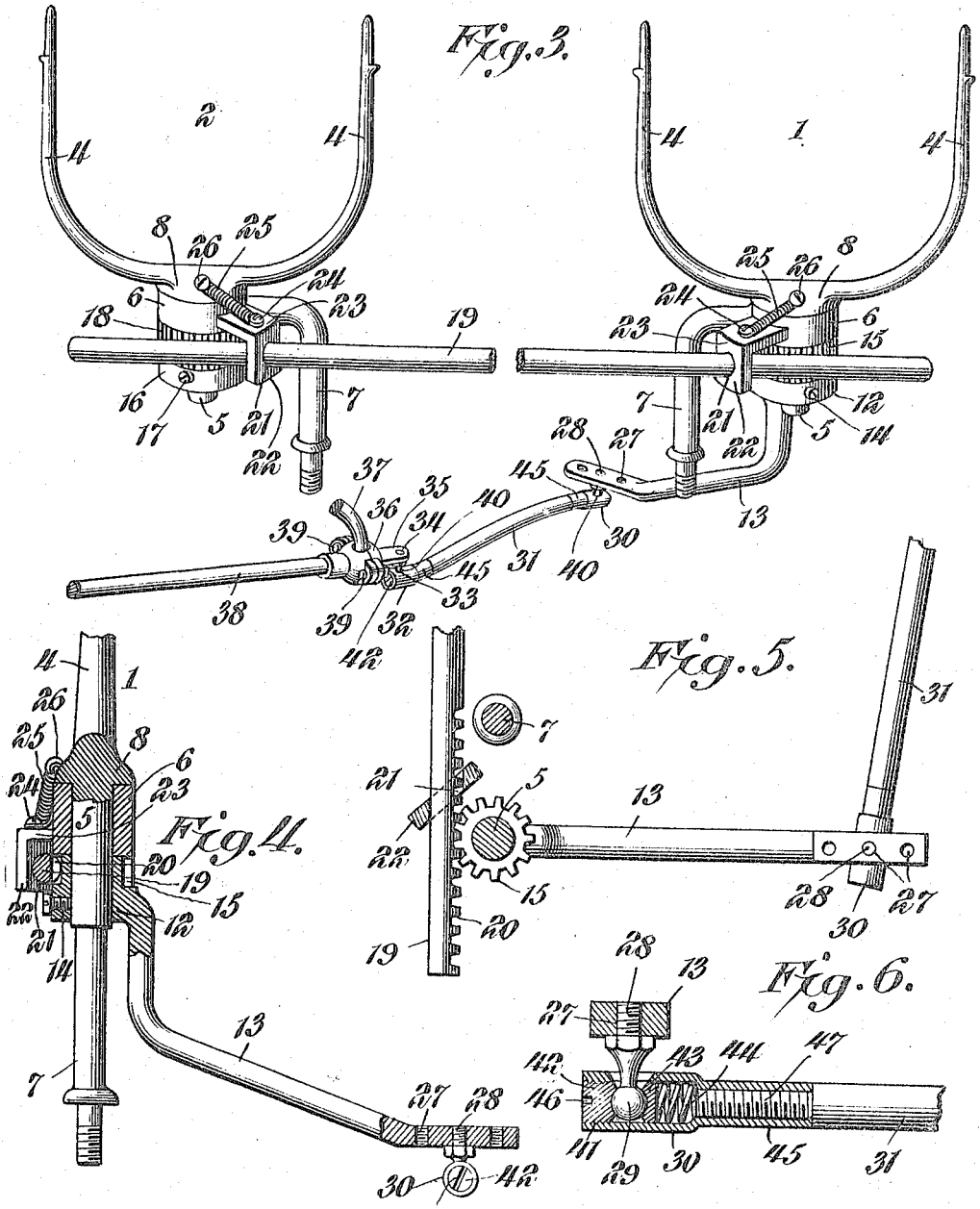

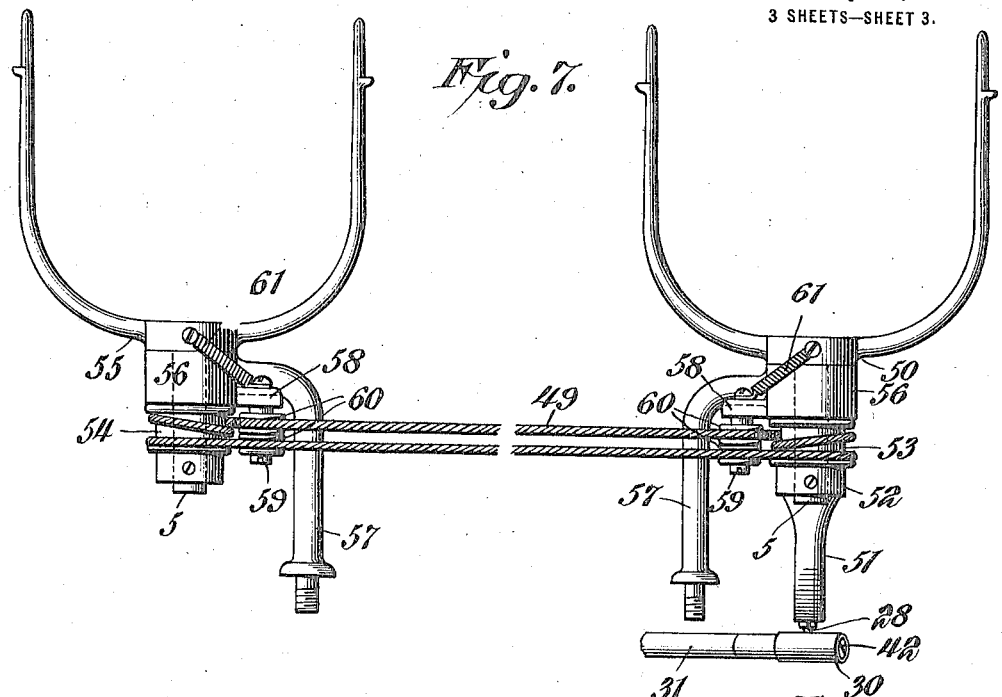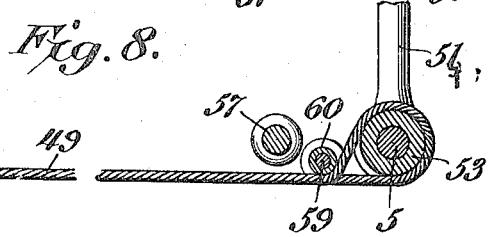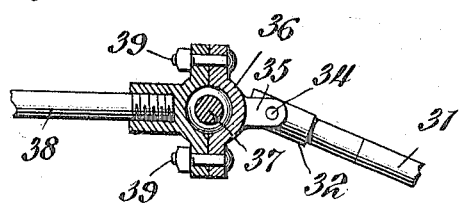

UNITED STATES PATENT OFFICE.

FRANCIS G. ANSPACH, OF DEERFIELD, MICHIGAN, ASSIGNOR OF ONE-FOURTH TO VERNON B. CANNON, OF WHITTIER, CALIFORNIA.

CONTROLLABLE HEADLIGHT FOR AUTOMOBILES.

1,145,961.     Specification of Letters Patent.     Patented July 13, 1915.

Application filed February 9, 1914. Serial No. 817,624.

*To all whom it may concern:*

Be it known that I, FRANCIS G. ANSPACH, a citizen of the United States, residing at Deerfield, in the county of Lenawee and State of Michigan, have invented a new and useful Controllable Headlight for Automobiles, of which the following is a specification.

The invention relates to an automatic controlling device for automobile headlights.

The object of the present invention is to improve the construction of controllable headlights for automobiles, and to provide a simple, practical and inexpensive device characterized by great lightness and durability and designed particularly for use on the Ford machine and other automobiles having steering gear of the same type, and adapted to be readily applied to the same and capable of turning the headlights of an automobile to the desired angle in the same direction as the front wheels thereof, and equipped with means for maintaining the headlights in a central steady position while the machine is traveling straight ahead and for preventing the slight turning or weaving of the wheels incident to the travel of the machine over a rough road from being transmitted to the headlights and producing a swaying or vibration of the same.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a front elevation of an automatic headlight controlling device, constructed in accordance with this invention and shown applied to a Ford machine. Fig. 2 is a plan view of the same, parts of the automobile being omitted. Fig. 3 is an enlarged perspective view of the device detached. Fig. 4 is an enlarged detail vertical sectional view, illustrating the manner of mounting the headlight at the left hand side of the machine. Fig. 5 is a horizontal sectional view of the same. Fig. 6 is an enlarged detail sectional view, illustrating the construction of the ball joints of the connecting link or rod. Fig. 7 is an elevation of an automatic headlight controlling device, illustrating another form of the invention. Fig. 8 is a horizontal sectional view of the same. Fig. 9 is an enlarged detail sectional view, illustrating the construction for connecting the link or rod with the steering gear.

Like numerals of reference designate corresponding parts in all the figures of the drawings.

In the accompanying drawings in which is illustrated the preferred embodiment of the invention, the automatic headlight controlling device is shown applied to a Ford automobile and it comprises in its construction a pair of lamp carrying brackets or members 1 and 2 in which headlights 3 of the ordinary construction are mounted. Each lamp carrying bracket or member is provided with spaced upwardly extending arms or forks 4, and it has a central depending vertically disposed spindle or pivot 5 mounted in a vertical bearing sleeve 6 of a stationary supporting bracket 7, which is adapted to be substituted for the ordinary lamp bracket of a Ford machine. The lamp carrying bracket or member is provided at the upper end of the spindle 5 with a head or enlargement 8 forming a shoulder, which rests upon the upper end of the bearing sleeve 6. The stationary bracket 7 consists of a vertical post having its upper end bent laterally and extending outwardly and carrying the vertically disposed bearing sleeve. The lower end of the stationary bracket is reduced and threaded for the reception of a nut 9. The threaded lower ends of the stationary bracket 7 pierce the front fender braces 10 and are secured to the same at the inner portions thereof by the nuts 9, cotter pins 11 being preferably employed for retaining the nuts in place. The depending spindles are of a length to extend below the bearing sleeve 6, and the spindle of the lamp carrying bracket or member 1 has secured to it a sleeve 12 of an oscillatory arm 13. The sleeve 12 is adjustably clamped to the lower portion of the spindle 5 by a set screw 14, piercing the sleeve at the lower portion thereof and adapted to permit a relative adjustment of the arm 13 and the lamp carrying bracket or member 1. The said sleeve 12 is provided at its upper portion with an integral pinion 15, and it fits against the lower end of the bearing sleeve and is adapted to retain the spindle 5 therein. The lower portion of the other lamp carrying bracket or member 2 is also retained in the vertical opening of its respective bearing bracket 7 by a sleeve 16 secured by a set screw 17 to the lower portion of the spindle 5 of the lamp carrying bracket or member 2, and provided at its upper portion with a pinion 18, which fits against the lower end of the sleeve of the stationary bearing bracket.

The pivoted lamp carrying brackets or members are caused to move in unison by a horizontal rod or bar 19, disposed transversely and extending across the front of the machine and provided with teeth 20, forming terminal racks, which mesh with the teeth of the pinions 15 and 18. The rack bar or rod 19 is slidable in transversely alined openings 21 of guides 22 consisting of substantially L-shaped bracket arms 23 having horizontal top portions converging forwardly and supporting outer depending portions, arranged at an angle to each other and provided with the said openings 21. The guides 22 support the rod 19 at the front of the pinions and when the pinion at the left hand side of the machine is actuated by the means hereinafter described, the lamp carrying brackets or members will be simultaneously rotated on a vertical axis to turn the headlights in the direction of the front wheels. The top portions of the guides 23 have attached to them by screws 24 or other suitable fastening devices the lower front ends of spiral springs 25 secured at their upper ends to the lamp carrying brackets or members at the centers of the heads or enlargements 8 by screws 26. The springs are adapted to maintain the headlights steady in a central position to throw the light directly in front of a machine when the latter is traveling in a straight direction, and the springs, which are normally under a predetermined tension, converge forwardly, whereby when the lamp carrying brackets or members are rotated in one direction, the tension of one of the springs will be increased. This will enable the spring to positively return the headlights to a central position when the same are free to respond to the action of such spring. The device as hereinafter fully explained is provided with means for permitting a limited independent movement of the steering gear so that the slight turning or weaving of the wheels will not be communicated to the headlights, and the springs 25 operate to hold the headlights firm and steady in their or weaving of the wheels until a positive movement of the machine is brought about by an operation of the steering gear.

The oscillatory arm 13 is angularly bent and consists of a front substantially vertical portion, an intermediate downwardly and rearwardly extending inclined portion, and a rear horizontally disposed portion, which is provided with a plurality of perforations 27 adapted to receive a threaded shank 28 of a ball 29. The ball 29 operates in a socket piece 30 at the front end of a connecting link or rod 31, which extends from the steering gear of the machine to the said arm 13 for actuating the latter. The connecting link or rod 31 is arranged in substantially a diagonal position, as clearly illustrated in Fig. 2 of the drawings, and it is provided at its rear end with a socket piece 32, receiving a ball 33, having a threaded stem 34 mounted in a threaded perforation of a lug or ear 35 of the detachable ball and socket cap 36 of the ball and socket joint, which connects the steering arm 37 of the steering gear with the drag link 38 thereof. The only alteration in the construction of the steering gear of a Ford machine, or a machine having a steering gear of the same type is the substitution of the ball and socket cap 36 for the ordinary ball and socket cap now in use on such steering gear, the fastening devices 39 for securing the ball and socket cap 36 in position being the same as those now employed on the ball and socket joint of the steering arm. The socket pieces 30 and 32 of the connecting link or rod 31 are provided at the top with an opening 40 through which extend the stems of the balls, as clearly illustrated in Fig. 6 of the drawings, and the outer end of the socket piece is provided with interior screw threads 41, which are engaged by an exteriorly threaded adjustable bearing member 42, located at one side of the ball, and the latter is engaged at the opposite side by a yieldable bearing member 43 held against the ball by a spiral spring 44, interposed between the bearing piece 43 and an interior shoulder formed by reducing the inner portion 45 of the socket piece. The adjustable bearing member 42, which is in the form of a threaded plug, is provided at its outer end with a groove 46 adapted to receive the blade of a screw driver, and it presents a concave inner face to the ball. The yieldable bearing member 43, which is circular, also presents a concave face to the ball and it is slidable along the socket piece, the coiled spring 44 operating to maintain the ball in contact with the adjustable bearing member and providing a lost motion device. The adjustable bearing members at the ends of the connecting link or rod are adapted to permit a limited independent movement or play of the parts, which is sufficient to allow for the slight turning or weaving movement of central position during the slight turning the front wheels incident to the passage of the machine over a rough roadway, and such vibratory or weaving movement of the front wheels is thereby prevented from being communicated to the headlights. The headlights are maintained in a relatively stationary position during such slight turning or weaving movement by the springs 25, which, of course, are superior in strength to the springs 43, in order to hold the lamps while the springs 43 are yielding to such vibratory movements. The reduced inner portions 45 of the socket pieces 30 and 32 are interiorly threaded to receive reduced terminal portions 47 of the connecting link or rod 31, and an adjustable connection between the socket piece and the link or rod 31 is provided to enable the rod to be varied in length to secure the proper adjustment of the automatic headlight controlling device so that the headlights may be moved the desired distance and will stand normally in a central position. The steering arm 37 is secured to the lower end of the steering post 48 of the steering mechanism in the ordinary manner, and while it is preferable to connect the inner or rear end of the link or rod 31 to the steering gear at the adjacent terminal ball and socket joint of the drag link, the connection may be made at any other convenient point and any other universal joint may be substituted for the ball and socket joint.

The automatic headlight controlling device, which may be either applied to new cars or sold as an attachment for cars already in use, is adapted to be easily and quickly applied to the latter by taking off the regular lamp and bracket and substituting for the latter the stationary bearing bracket 7, using the same nuts and cotter pins as are used on the regular lamp brackets. The old form of ball and socket cap is then detached from the drag link and a new cap substituted for the same, using the old bolts and nuts. The lamps are then connected by the transverse rack bar or rod and the device is ready for use. In practice the device will be shipped to the consumer all adjusted. The adjustment is obtained as follows: Before applying the connecting rod, the pivoted lamp carrying bracket or member 1 at the left hand side of the machine is adjusted so as to set perfectly straight by lengthening and shortening the driving rod through the adjustment of the socket pieces. The other lamp carrying bracket 2 and the transverse rack bar or rod 19 are placed in position and adjusted to correspond with the headlight at the left hand side of the machine.

When the steering wheel is turned from the right or left in changing the direction of the machine, the steering post revolves carrying with it the steering arm, which is turned to the right or left with a lateral motion, and this movement is communicated to the connecting link or rod 31, which oscillates the arm 13 either to the right or left. This simultaneously rotates the headlights in turning the same in the same direction as the front wheels of the machine. If the headlights are turned to the right or left too far, the proper adjustment may be made through the threaded perforations 27 of the oscillatory arm 13.

The estimated cost of the device is less than one dollar, and in applying it to the Ford machine less than a pound and a half is added to the same. Owing to the simplicity of the device any one without mechanical skill can apply it in a few minutes and there is nothing to get out of order or out of adjustment, merely requiring proper lubrication to maintain it in perfect condition.

In Figs. 7 and 8 of the drawings is illustrated another form of invention in which an endless flexible connection 49 preferably consisting of a wire cable is employed for transmitting motion from one lamp carrying bracket or member to the other. The lamp carrying bracket or member 50 at the left hand side of the machine has pinned or otherwise secured at the lower end of the spindle an oscillatory arm 51 provided with a sleeve 52 receiving the lower portion of the said spindle and provided at its upper portion with an integral spool 53 on which is arranged one or more turns of the endless flexible connection 49. A spool 54 is secured on the lower portion of the spindle of the lamp carrying bracket or member 55 at the other side of the machine, and the said spool 54 receives a plurality of winds of the endless flexible connection 49. The lamp carrying brackets or members 50 and 55 are mounted in vertical bearing sleeves 56 of stationary brackets 57 constructed substantially the same as those heretofore described and provided with horizontally projecting lugs or arms 58 forming supports for depending stub shafts or pivots 59. The stub shafts or pivots 59, which may be of any preferred construction, receive grooved guide pulleys 60 arranged in pairs and adapted to guide upper and lower transverse stretches as the same extend to and leave the spools of the lamp carrying brackets or members. The endless flexible connection 49, which is adapted to transmit motion from the left hand lamp carrying bracket or member to the right hand lamp supporting bracket or member to produce a simultaneous turning of the headlights, enables the headlights to be placed in positions where it would be impossible to employ a rigid transversely disposed rack bar or member, as any number of guide pulleys may be employed to suit the arrangement of the headlights of a machine. The lamp carrying brackets or members 50 and 55 are normally maintained in a central position by coiled springs 61, secured at their upper ends to the said brackets 50 and 55 at the center of the lower portions of the same, and fixed at their lower ends to the horizontal lugs or arms 58 of the stationary brackets 57. The springs 61 operate substantially the same as the springs 25 heretofore described.

While in the accompanying drawings the oscillatory arm of the lamp carrying bracket or member is shown extending from the back of the said bracket or member, it may be connected with the same at the front or at any other convenient point.

What is claimed is:—

1. An automatic headlight controlling device including opposite pivotally mounted lamp carrying brackets or members, means for connecting the lamp carrying brackets with each other for causing the same to turn in unison, yieldable means for maintaining the lamp carrying brackets or members normally in a predetermined position, and mechanism for connecting one of the lamp carrying brackets or members with the steering gear of an automobile, said mechanism having a lost motion device provided with a spring of a strength less than the said yieldable means to permit the said yieldable means to hold the lamp carrying brackets or members in a relatively fixed position while the lost motion device is yielding to the slight vibration or weaving movement of the front wheels, and thereby prevent such movement from being communicated to the brackets or members.

2. An automatic headlight controlling device including opposite pivotally mounted lamp carrying brackets or members, means for connecting the brackets or members with each other for causing the same to turn in unison, springs connected with the brackets or members for normally maintaining the same in a predetermined position, and mechanism for connecting one of the said brackets or members with the steering mechanism of an automobile, said mechanism having a yieldable lost motion device provided with a spring of a strength less than the first mentioned springs to permit the said mechanism to yield to the slight vibration or weaving movement of the wheels while the lamps are held against such movement.

3. An automatic headlight controlling device including opposite pivotally mounted lamp carrying brackets or members, means for connecting the brackets or members with each other for causing the same to turn in unison, exteriorly arranged converging springs connected with the brackets or members for normally maintaining the same in a predetermined position, and mechanism for connecting one of the said brackets or members with the steering mechanism of an automobile, said mechanism having a yieldable lost motion device provided with a spring of a strength less than the first mentioned springs to permit the said mechanism to yield to the slight vibration or weaving movement of the wheels while the lamps are held against such movement.

4. An automatic headlight controlling device including stationary brackets having bearing sleeves and provided with exteriorly arranged guides, lamp carrying brackets provided with spindles extending through the sleeves, pinions connected with the spindles, a rack bar slidable in the said projecting guides and meshing with the pinions, exteriorly arranged springs secured at one end to the projecting guides and connected at the other end to the lamp carrying brackets for holding the lamp carrying brackets normally in a predetermined position, and mechanism for connecting one of the lamp carrying brackets with the steering gear of an automobile.

5. An automatic headlight controlling device including stationary brackets having bearing sleeves and provided with projecting guides, lamp carrying brackets having spindles mounted in the sleeves, pinions fixed to the spindles below the sleeves to retain the said spindles therein, a rack bar slidable in the guides and meshing with the pinions, converging springs secured at one end to the guides and at the other end to the lamp carrying brackets for maintaining the same normally in a predetermined position, and mechanism for connecting one of the lamp carrying brackets with the steering gear of an automobile.

6. The combination with a steering gear including a drag link having a socket provided with a removable cap, the latter having a projecting lug, and a steering arm having a ball fitted in the socket of the drag link, of an automatic headlight controlling device comprising pivotally mounted lamp carrying brackets, means for transmitting motion from one lamp carrying bracket to the other, an arm extending from one of the lamp carrying brackets, and a link rod connected with the last-mentioned arm and with the lug of the cap piece.

In testimony, that I claim the foregoing as my own, I have hereto affixed my signature in the presence of two witnesses.

FRANCIS G. ANSPACH.

Witnesses:
ALBERT A. CHESMAN,
JAMES MANING.